(12) United States Patent
Yanovsky (10) Patent No.: US 7,010,807 B1
(45) Date of Patent: Mar. 7, 2006

(54) SYSTEM AND METHOD FOR NETWORK VIRUS PROTECTION

(75) Inventor: Boris Yanovsky, Saratoga, CA (US)

(73) Assignee: SonicWALL, Inc., Sunnyvale, CA (US)

( * ) Notice: Subject to any disclaimer, the term of this patent is extended or adjusted under 35 U.S.C. 154(b) by 839 days.

(21) Appl. No.: 09/835,054

(22) Filed: Apr. 13, 2001

(51) Int. Cl.
G06F 11/00 (2006.01)
G06F 17/30 (2006.01)

(52) U.S. Cl. .................. 726/24; 726/1; 726/3; 726/22; 726/23

(58) Field of Classification Search ........ 713/200–201, 713/188, 187, 191; 709/200, 223–225, 229; 726/1, 3, 22–24
See application file for complete search history.

(56) References Cited

U.S. PATENT DOCUMENTS

| | | | | |
|---|---|---|---|---|
| 5,987,611 | A | * | 11/1999 | Freund ........................ 713/201 |
| 6,728,886 | B1 | * | 4/2004 | Ji et al. ........................ 713/201 |
| 6,763,466 | B1 | * | 7/2004 | Glover ........................ 713/200 |
| 6,826,698 | B1 | * | 11/2004 | Minkin et al. ............... 713/201 |
| 2003/0055994 | A1 | | 3/2003 | Herrmann et al. | |

OTHER PUBLICATIONS

Sonicwall Ships Network Anti-Virus, Sonicwall Press Release dated Jun. 12, 2000, http://www.sonicwall.com/../General/DisplayDetails.asp?id=42 (2 pgs).
Sonicwall Partners with Mycio.com to Deliver Anti-Virus Application Services, Sonicwall Press Release dated Feb. 22, 2000, http://www.sonicwall.com/../General/DisplayDetails.asp?id=81 (3 pgs).
Learn More About Viruses and Worms, Symantec AntiVirus Research Center (2 pgs).
Virus Descriptions, Virus Backgrounder, AntiVirus Research Center, Symantec United States, dated Dec. 5, 2000 (7 pgs).
Understanding Heuristics: Symantec's Bloodhound Technology, Symantec White Paper Series vol. XXXIV (14 pgs), Table of Contents (1 pg).
Lower IT Costs through Better Anti-Virus Management, A Symantec Corporate Solution (20 pgs), Table of Contents (1 pg).
Understanding and Managing Polymorphic Viruses, The Symantec Enterprise Papers vol. XXX (13 pgs), Table of Contents (1 pg).

* cited by examiner

*Primary Examiner*—Hosuk Song
(74) *Attorney, Agent, or Firm*—Blakely, Sokoloff, Taylor & Zafman, LLP (57) ABSTRACT

A system and method for virus protection of computers on a local area network (LAN) is disclosed. The LAN's anti-virus policy is programmed into the firewall, or other Internet access module, which applies that policy to the client computers on the LAN. This policy might include the frequency with which the anti-virus software is updated and the number of versions that the software is permitted to be out of date. Any client computer not meeting the policy is not permitted to access the Internet. The firewall can also update out of date client computers to make them compliant with the policy.

48 Claims, 6 Drawing Sheets

SYSTEM AND METHOD FOR NETWORK VIRUS PROTECTION

FIELD OF THE INVENTION

The field of the invention relates to anti-virus protection. More specifically, the invention relates to anti-virus protection of a local area network.

BACKGROUND OF THE INVENTION

A computer virus is a self-replicating program designed to spread without user intervention or knowledge. Computer viruses are spread by attaching themselves to another program, such as a macro attached to e-mail. A worm is a type of computer virus that can transmit itself to a second computer over a network. The increased access to e-mail at the workplace has allowed viruses and worms to spread at a much faster rate. The number of viruses "in the wild," or present in more than one company or organization, have increased dramatically since widespread Internet access has become available.

Most companies allow Internet access by creating a local area network (LAN). Access to the LAN by the Internet is protected by a "firewall". Such a network allows programs on one computer to be accessed by all the computers on the LAN. Unfortunately, this access means that once a virus infects one computer, all the other computers in a LAN may soon be infected as well.

The standard protection against virus is an anti-virus software application that analyzes software applications and isolates any latent viruses. This anti-virus software has a set of virus characteristics that the software searches for in the computer. Each time a new virus is created or evolved, a new anti-virus characteristic must be updated to the computer in order for the anti-virus software to detect the virus.

There are two methods that are used prominently for administering anti-virus software. One method is to install anti-virus software directly into the firewall. The firewall attempts to scan for viruses on the fly while the client computer is receiving the data and then aborts the transfer if a virus is detected. This method has several disadvantages. Having a single point for scanning data creates a bottleneck and slows down the system performance. Additionally, this method only prevents viruses from entering from the Internet and fails to provide protection from viruses distributed locally either through the LAN from one computer to the other or through external media, such as floppy disks.

The second method is to install an anti-virus client on each individual computer and manage them separately. This protection also has several disadvantages. This method fails to guarantee all the computers on the LAN have the software installed and properly configured, that the virus scanning engine and data files are up-to-date, and that the individual computer user did not disable the anti-virus software.

What is needed is a method of administering anti-virus applications so that a LAN is protected from both Internet infections and internal infections (from other computers in the LAN) as well. What is further needed is a method of administering anti-virus applications so that scanning engine and data files may be made up-to-date on each computer on the LAN.

SUMMARY OF THE INVENTION

A system and method for administrating and managing anti-virus protection on a local area network (LAN) is described. In one embodiment, the LAN's anti-virus policy is programmed into an access module. In another embodiment, the access module may be an Internet access module and/or in a firewall. The access module applies the anti-virus policy to client computers on the LAN. In another embodiment, the policy might include the frequency with which the anti-virus software is updated and the number of versions that the software is permitted to be out-of-date. Any client computer not meeting the policy is not permitted to access the Internet. The access module can also update out-of-date client computers to make them compliant with the policy.

BRIEF DESCRIPTION OF THE DRAWINGS

The present invention is illustrated by way of example and not limitation in the figures of the accompanying drawings, in which.

DETAILED DESCRIPTION

A system and method for enforcing and maintaining anti-virus protection policies for computers on a local area network (LAN) is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

In the following description, numerous details are set forth, such as distances between components, types of molding, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Figure 1:
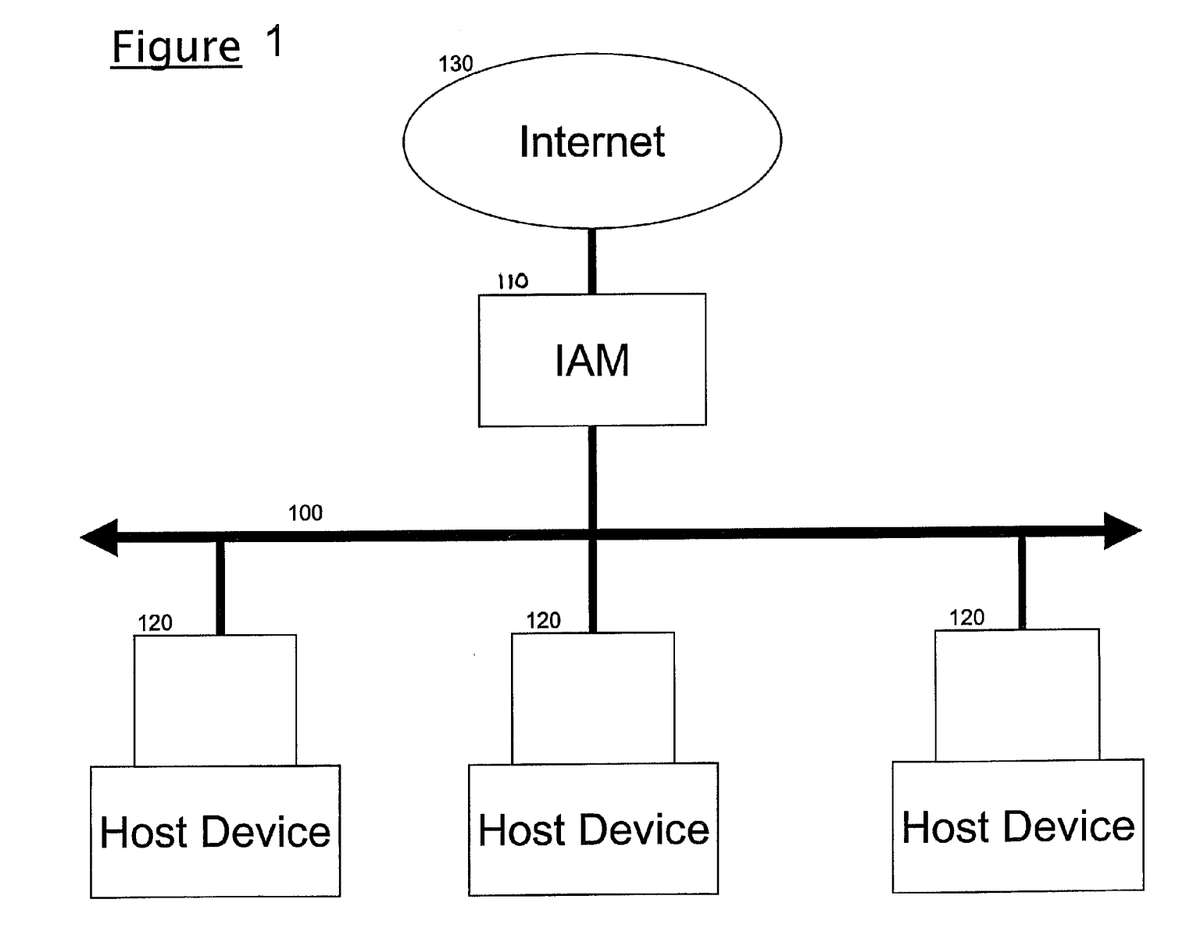
FIG. 1 illustrates one embodiment of a configuration of a local area network.

In one embodiment illustrated by the block diagram of FIG. 1, the system administrator for the LAN 100 sets the policy for anti-virus protection for the LAN and installs this policy into an Internet access module (IAM) 110. This Internet access module 110 may comprise a live firewall, a proxy server, a router, a modem, a gateway, or an application server. The IAM 110 then enforces and maintains the anti-virus policy, updating the anti-virus on the host devices 120, such as personal computers, where needed. In one embodiment, the IAM 110 denies access to the Internet 130 for any of host devices 120 that fail to meet the requirements, within some preset tolerances, for the anti-virus policy. The IAM 110 sends updates to the anti-virus protection (AVP) on the host device. In one embodiment, if the AVP is disabled for a host device, the IAM 110 instructs the user to enable the AVP.

In one embodiment, the system administrator sets the tolerances. These tolerances may include the oldest permissible version of the software, longest time without an update, and, in specific cases, necessary virus search identifiers. In one embodiment, the tolerances under the anti-virus protection policy can differ between two host devices on the same local area network. In one embodiment, these tolerances are checked when the host device tries to access the Internet. In an alternative embodiment, the IAM can use an out-of-band protocol, based, for example, on a user datagram protocol (UDP), to test what version or when the last update was installed upon a host device. In one embodiment, to prevent corruption by a viral agent, communications over the out-of-band protocol are encrypted.

Figure 2:
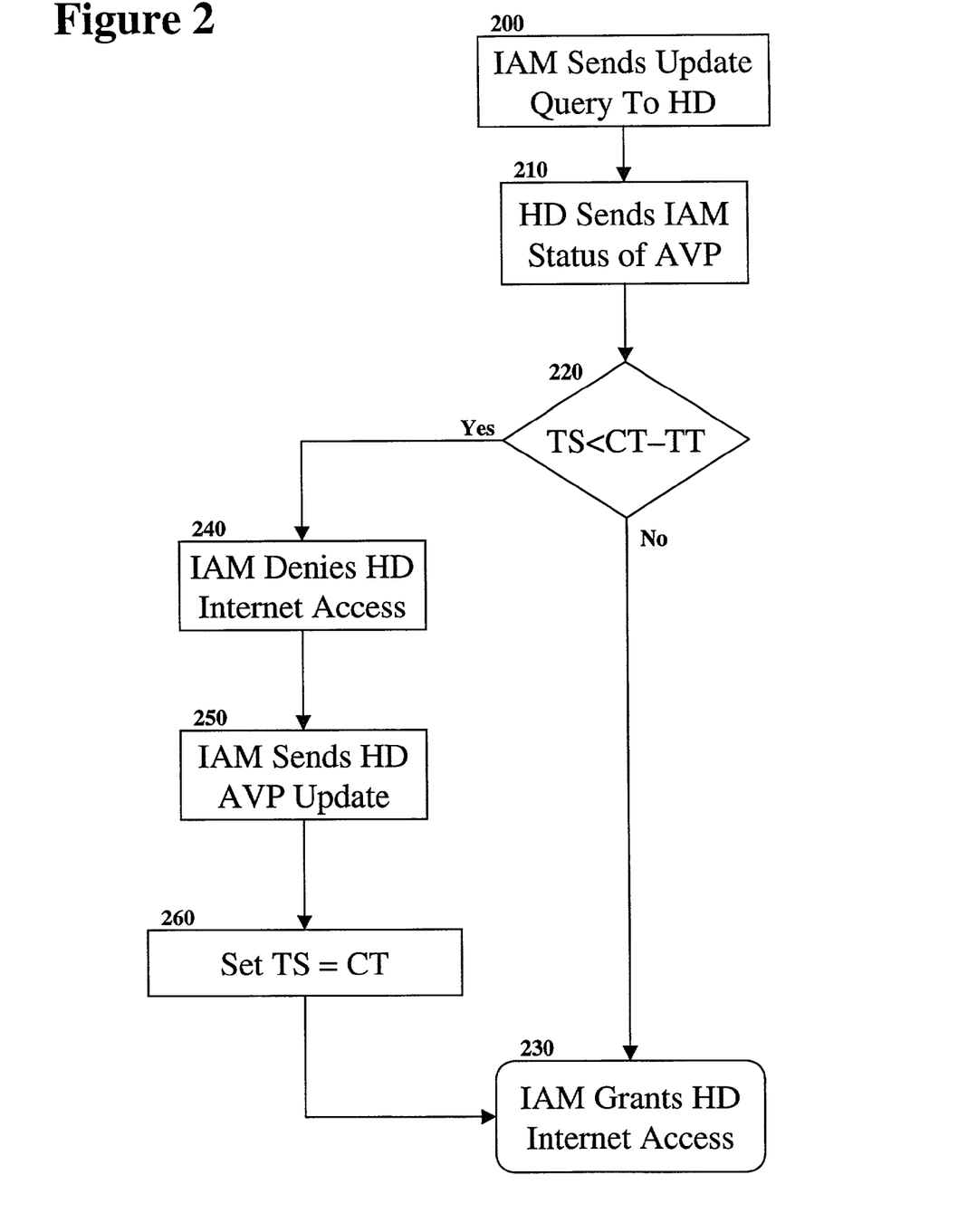
FIG. 2 is a flow diagram illustrating one embodiment of a process for updating the anti-virus protection based on time.

FIG. 2 is a flow diagram illustrating one embodiment of a method for updating the anti-virus protection based on time. The process is performed by processing logic that may comprise hardware (e.g., circuitry, dedicated logic, etc.), software (such as is run on a general purpose computer system or a dedicated machine, etc.), or a combination of both.

Referring to FIG. 2, the IAM sends an update query to the host device (HD) as to the status of the host device's anti-virus protection (AVP) (processing block 200). Such a query may be sent at any time. In one embodiment, the update query may be sent when a personal computer is turned on or joins a network. The host device responds to the query with the status of the AVP (processing block 210). In one embodiment, the response includes a timestamp (TS). The IAM checks the timestamp against the last available (processing block 220). If the timestamp is not less than the available time minus the preset time tolerance (TT), then the IAM grants the host device Internet access (processing block 230). If the timestamp is less than the current time minus the preset time tolerance, then the IAM denies the host device Internet access (processing block 240). In one embodiment, the IAM can then send to the host device the software components needed to update the host device's AVP (processing block 250) and sets the timestamp to the current time (processing block 260). Thereafter, the host device is granted Internet access by the IAM (processing block 230).

The IAM may also send commands. In one embodiment, these commands include, for example, a command to request status of the anti-virus protection of the at least on host device, a command to have the at least one host to update the anti-virus protection, a command to uninstall the anti-virus protection, and a command to check a specific file or directory for a virus, for example.

Figure 3:
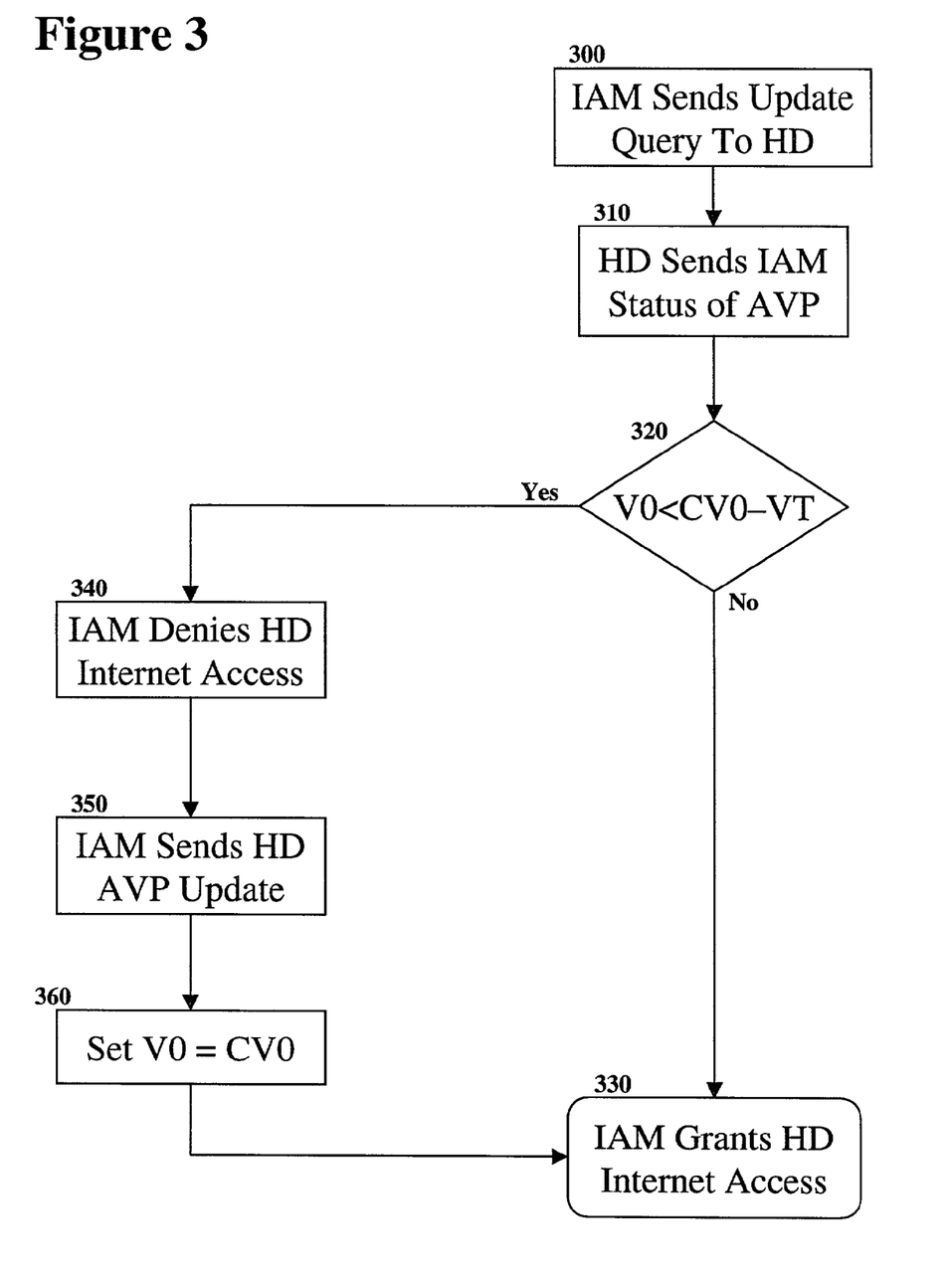
FIG. 3 is a flow diagram illustrating one embodiment of a process for updating the anti-virus protection based on software version number.

FIG. 3 is a flow diagram illustrating one embodiment of a method for updating the anti-virus protection based on software version number. The process is performed by processing logic that may comprise hardware (e.g., circuitry, dedicated logic, etc.), software (such as is run on a general purpose computer system or a dedicated machine, etc.), or a combination of both.

Referring to FIG. 3, the IAM again sends an update query to the host device (HD) as to the status of the host device's anti-virus protection (AVP) (processing block 300). The host device responds to the query with the status of the AVP (processing block 310). In one embodiment, the response includes a version number (V0) for the AVP software. The IAM checks the version number against the current version number (CV0) (processing block 320). If the version number is not less than the current version number minus the version tolerance (VT), then the IAM grants the host device Internet access (processing block 330). If the version number is less than the current version number minus the preset version tolerance, then the IAM denies the host device Internet access (processing block 340). In one embodiment, the IAM can then send to the host device the software components needed to update the host device's AVP (processing block 350) and sets the version to the current version number (processing block 360). Thereafter, the host device is granted Internet access by the IAM (processing block 330).

Figure 4:
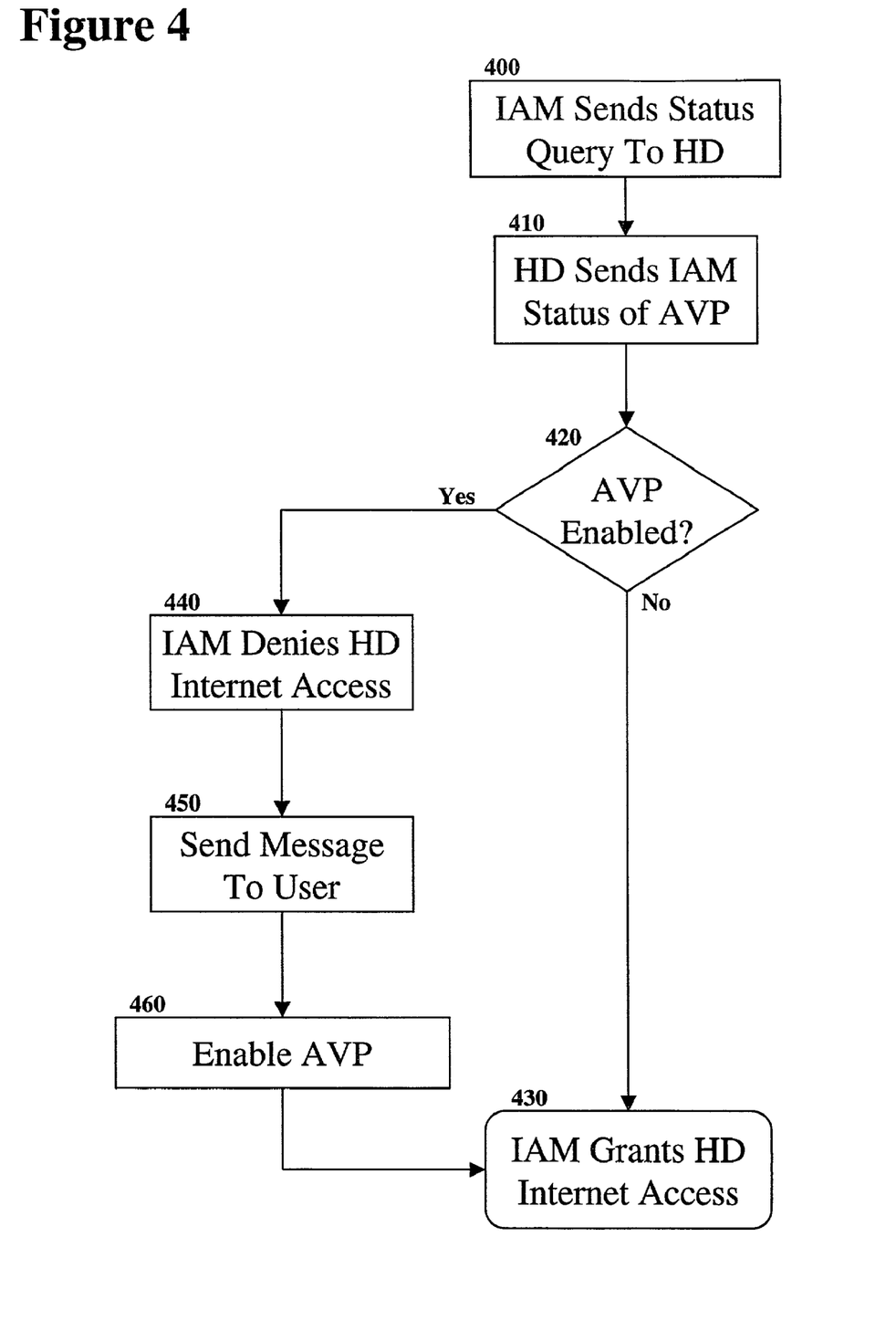
FIG. 4 is a flow diagram illustrating one embodiment of a process for determining if a host device's anti-virus protection has been disabled.

FIG. 4 is a flow diagram illustrating one embodiment of a method for determining if a host device's anti-virus protection has been disabled. The process is performed by processing logic that may comprise hardware (e.g., circuitry, dedicated logic, etc.), software (such as is run on a general purpose computer system or a dedicated machine, etc.), or a combination of both.

Referring to FIG. 4, processing logic in the IAM sends a status query to the host device (HD) as to the host device's anti-virus protection (AVP) (processing block 400). The host device responds to the query with the status of the AVP (processing block 410). Processing logic determines whether the AVP is fully enabled. If the AVP is fully enabled, then processing logic in the IAM grants the host device Internet access (processing block 430). If the AVP is not fully enabled, then processing logic in the IAM denies the host device Internet access (processing block 440) and sends a message to the user of the host device to inform the user that the AVP on that host device is disabled (processing block 450). Processing logic in the IAM then sends to the host device the software components needed to enable the host device's AVP or provides the user with instructions as to enabling the AVP of the host device (processing block 460). After the AVP is enabled, processing logic in the IAM grants the host device Internet access (processing block 430).

Figure 5:
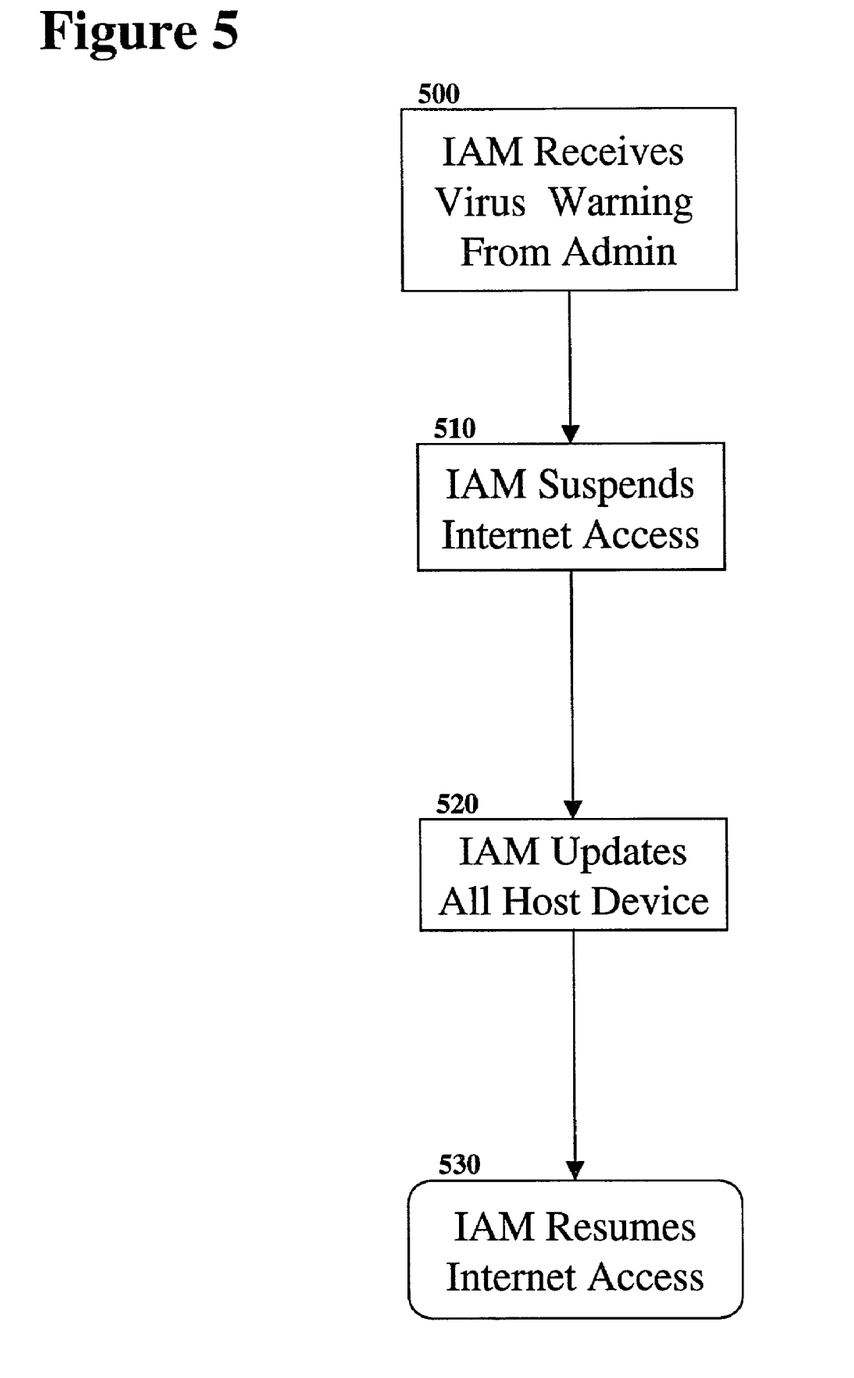
FIG. 5 is a flow diagram illustrating one embodiment of a process for overriding the tolerances during an emergency virus alert.

In one embodiment, in case of an emergency situation, where the AVP needs to be updated immediately, the tolerances set by the administrator can be overridden. As illustrated in FIG. 5, in one embodiment, the system administrator sends a virus warning to the IAM (processing block 500). Processing logic in the IAM then suspends all Internet access (processing block 510) and proceeds to update all host devices on the LAN (processing block 520). After the host devices have been updated, processing logic in the IAM enables Internet access to resume (processing block 530). In one embodiment, Internet access for a device may resume once that device has been updated.

Figure 6:
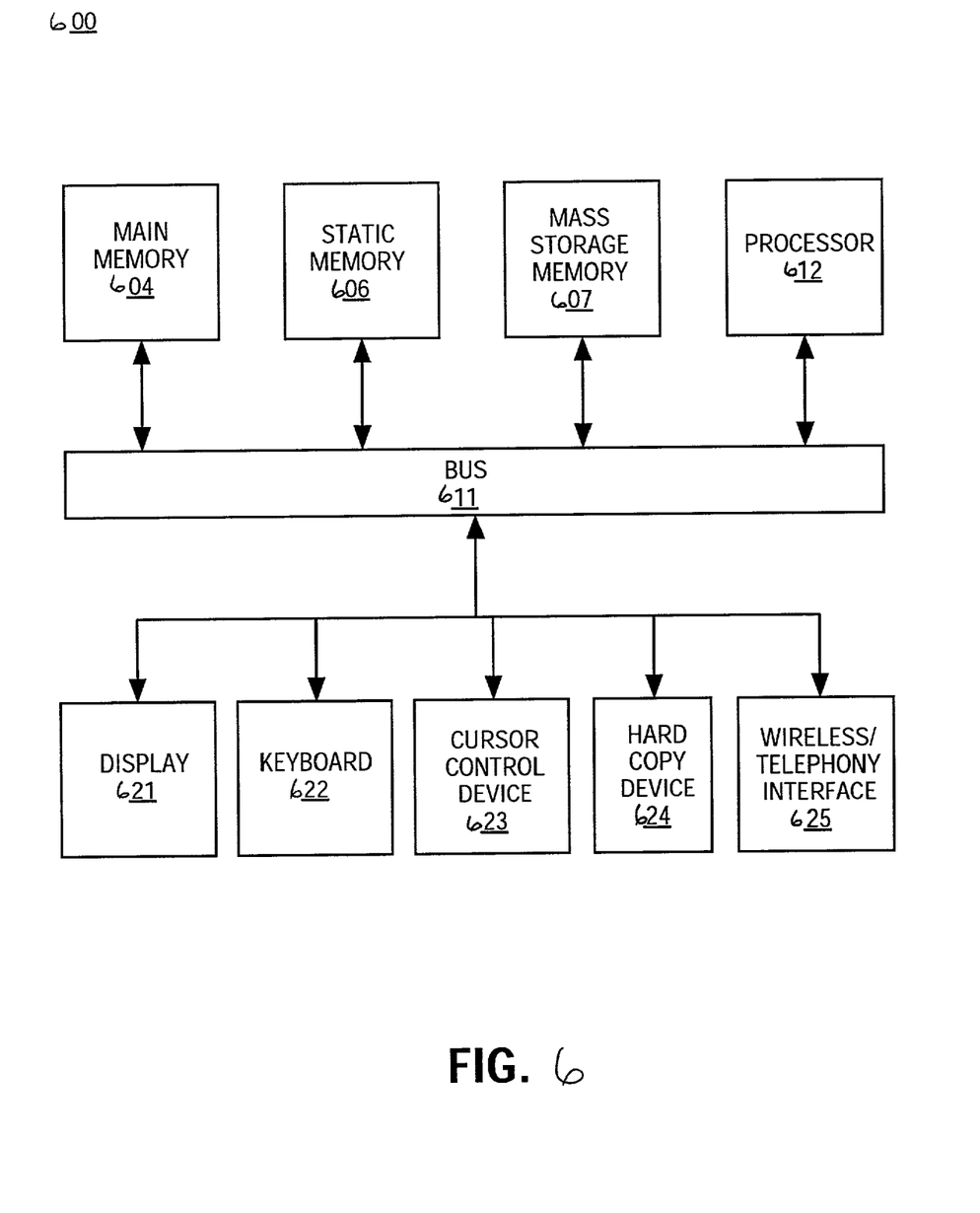
FIG. 6 is one embodiment of a computer system.

FIG. 6 is a block diagram of an exemplary computer system that may perform one or more of the operations described herein. Referring to FIG. 6, computer system 600 may comprise an exemplary client 650 or server 600 computer system. Computer system 600 comprises a communication mechanism or bus 611 for communicating information, and a processor 612 coupled with bus 611 for processing information. Processor 612 includes a microprocessor, but is not limited to a microprocessor, such as, for example, Pentium™, PowerPC™, Alpha™ etc.

System 600 further comprises a random access memory (RAM), or other dynamic storage device 604 (referred to as main memory) coupled to bus 611 for storing information and instructions to be executed by processor 612. Main memory 604 also may be used for storing temporary variables or other intermediate information during execution of instructions by processor 612.

Computer system 600 also comprises a read only memory (ROM) and/or other static storage device 606 coupled to bus 611 for storing static information and instructions for processor 612, and a data storage device 607, such as a magnetic disk or optical disk and its corresponding disk drive. Data storage device 607 is coupled to bus 611 for storing information and instructions.

Computer system 600 may further be coupled to a display device 621, such as a cathode ray tube (CRT) or liquid crystal display (LCD), coupled to bus 611 for displaying information to a computer user. An alphanumeric input device 622, including alphanumeric and other keys, may also be coupled to bus 611 for communicating information and command selections to processor 612. An additional user input device is cursor control 623, such as a mouse, trackball, trackpad, stylus, or cursor direction keys, coupled to bus 611 for communicating direction information and command selections to processor 612, and for controlling cursor movement on display 621.

Another device that may be coupled to bus 611 is hard copy device 624, which may be used for printing instructions, data, or other information on a medium such as paper, film, or similar types of media. Furthermore, a sound recording and playback device, such as a speaker and/or microphone may optionally be coupled to bus 611 for audio interfacing with computer system 600. Another device that may be coupled to bus 611 is a wired/wireless communication capability 625 to communication to a phone or handheld palm device.

Note that any or all of the components of system 600 and associated hardware may be used in the present invention. However, it can be appreciated that other configurations of the computer system may include some or all of the devices.

Thus, a software application system is described which enforces and maintains local area network anti-virus policies. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A system, comprising:
    a local area network (LAN) having at least one host device, the at least one host device having software to perform anti-virus scanning;
    a communication module to communicate anti-virus protect ion information for the at least one host device to an access module, the anti-virus protection information including status of anti-virus protection of the at least one host device; and
    the access module coupled to the LAN to maintain a policy regarding anti-virus protection for the LAN and manage anti-virus protection scanning performed by the at least one host device, the access module to exchange anti-virus protection information with the at least one host device using the communication module of the at least one host device, and, if the status of the anti-virus protection of the at least one host device is not compliant with the policy, to deny the at least one host device access to the Internet and to bring the anti-virus protection of the at least one host device into compliance with the policy.

2. The system defined in claim 1 wherein the communication module is part of the at least one host device.

3. The system defined in claim 1 wherein the access module sends at least one command to the at least one host device via the communication module.

4. The system defined in claim 3 wherein the at least one command comprises a command selected from a group comprising: a command to request status of the anti-virus protection of the at least on host device, a command to have the at least one host to update the anti-virus protection, a command to uninstall the anti-virus protection, and a command to check a specific file or directory.

5. The system of claim 1, wherein a system administrator sets a range of compliance for the anti-virus protection policy.

6. The system of claim 5, wherein the Internet access module denies access to the Internet to the at least one host device if not in the range of compliance.

7. The system of claim 1, wherein the access module enforces and maintains the anti-virus protection policies for more than one host device.

8. The system of claim 7, wherein the anti-virus protection policies differ between host devices on the LAN.

9. The system of claim 1, wherein the status of the anti-virus protection of the host device includes a version number of the anti-virus protection software on the host device.

10. The system of claim 1, wherein the status of the anti-virus protection of the host device includes a time stamp indicating when the anti-virus protection software was last updated on the host device.

11. The system of claim 1, wherein the access module initiates an update in anti-virus protection for the host-device.

12. The system of claim 1, wherein the host device reports a problem with a virus to the Internet access module.

13. The system of claim 1, wherein the access module is one or more of:
a live firewall, a proxy server, a router, or a gateway.

14. The system of claim 1, wherein the access module is an application server.

15. A method, comprising:
connecting a local area network to an Internet via an Internet access module;
connecting a host device to the Internet via the local area network; and
using the Internet access module to enforce a policy for anti-virus protection on
the host device based on the status of anti-virus protection on the host device, wherein the using includes,
denying the host device access to the Internet if the status of the anti-virus protection on the host device is not compliant with the policy, wherein the denying includes,
applying a range of compliance for the anti-virus protection policy set by a system administrator, removing the range of compliance and requiring the most current anti-virus protection upon notice of a virus alert.

16. The method of claim 15, further comprising connecting the host device with the Internet access module via an out of band protocol.

17. The method of claim 16, further comprising communicating a version number of the anti-virus protection on the host device to the Internet access module over the out of band protocol.

18. The method of claim 16, further comprising communicating a time stamp indicating when the anti-virus protection was last updated on the host device to the Internet access module over the out of band protocol.

19. The method of claim 16, further comprising initiating an update in anti-virus protection for the host device over the out of band protocol.

20. The method of claim 16, further comprising encrypting the out of band protocol.

21. The method of claim 15, further comprising connecting more than one host device to the local area network.

22. The method of claim 21, further comprising using the Internet access module enforces and maintains the anti-virus protection policies for more than one host device.

23. The method of claim 22, wherein the anti-virus protection policies differ between host devices.

24. The method of claim 15, further comprising the host device is checked repeatedly to make sure the anti-virus protection is not disabled.

25. The method of claim 15, further comprising reporting a problem with a virus to the Internet access module.

26. A system, comprising:
a local area network (LAN) having at least one host device, the at least one host device having software to perform anti-virus scanning;
a communication module to communicate anti-virus protection information for the at least one host device to an access module, the anti-virus protection information including status of anti-virus protection of the host device; and
the access module coupled to the LAN to maintain a policy regarding anti-virus protection for the LAN and manage anti-virus protection scanning performed by the at least one host device, the access module to exchange anti-virus protection information with the at least one host device using the communication module of the at least host device and to deny the at least one host device access to the Internet if the at least one host device docs not have anti-virus protection compliant with the policy, wherein compliance with the policy is either a range of compliance or the most up to date anti-virus protection depending on whether there is currently a virus alert.

27. The system of claim 26, wherein the access module enforces and maintains the anti-virus protection policies for more than one host device; and
wherein the anti-virus protection policies differ between host devices on the LAN.

28. The system of claim 26, wherein the status of the anti-virus protection of the at least one host device includes one or more of a version number of the anti-virus protection software on the host device and a time stamp indicating when the anti-virus protection software was last updated on the host device.

29. The system of claim 26, wherein the access module initiates an update in anti-virus protection for the at least one host device.

30. The system of claim 26, wherein the at least one host device reports a problem with a virus to the access module.

31. The system of claim 26, wherein the access module is one or more of:
a live firewall, a proxy server, a router, a modem, a gateway, or an application server.

32. An apparatus comprising:
an Internet access module to be coupled to connect the Internet and a local area network (LAN) including host devices, the Internet access module to receive from the host devices their anti-virus protection status and to deny Internet access to those of the host devices whose anti-virus protection status is not compliant with a corresponding anti-virus protection policy and make available software components necessary to bring those host devices whose anti-virus protection status is not compliant into compliance with the corresponding anti-virus protection policy.

33. The apparatus of claim 32, wherein the anti-virus protection policy includes a range of compliance.

34. The apparatus of claim 32, wherein the anti-virus protection policy differs between the host devices on the LAN.

35. The system of claim 32, wherein the status of the anti-virus protection of at least one of the host devices includes one or more of a version number of the anti-virus protection software on that host device and a time stamp indicating when the anti-virus protection software was last updated on that host device.

36. The system of claim 32, wherein the Internet access module initiates an update in anti-virus protection for at least one of the host devices.

37. The system of claim 32, wherein the Internet access module is one or more of:
a live firewall, a proxy server, a router, a modem, a gateway, or an application server.

38. The system of claim 32, wherein compliance with the anti-virus protection policy is either a range of compliance or the most up to date anti-virus protection depending on whether there is currently a virus alert.

39. A method comprising:
enforcing anti-virus protection in a module providing Internet access to a plurality of host devices belonging to a local area network by performing the following for each of the plurality of host devices repeatedly,
receiving status of the anti-virus protection on the host device,
determining compliance with an anti-virus protection policy based on the anti-virus protection status,
denying Internet access to the host device if its anti-virus protection status is determined not compliant, and
providing software components to bring the host devices into compliance with the anti-virus protection policy if its anti-virus protection status is determined not compliant.

40. The method of claim 39, wherein the determining compliance including determining if the anti-virus protection status is within a range of compliance.

41. The method of claim 39, the performing for each of the plurality of host devices also includes removing the range of compliance upon notices of a virus alert.

42. The method of claim 39, wherein status of the anti-virus protection includes one or more of a version number of the anti-virus protection software on the host device and when the anti-virus protection software was last updated.

43. The method of claim 39, wherein the performing for each of the plurality of host devices also includes initiating an update of the anti-virus protection on the host device.

44. A machine-readable medium that provides instructions, which when executed by a machine, cause said machine to perform operations comprising:
enforcing anti-virus protection in a module providing Internet access to a plurality of host devices belonging to a local area network by performing the following for each of the plurality of host devices repeatedly,
receiving status of the anti-virus protection on the host device,
determining compliance with an anti-virus protection policy based on the anti-virus protection status,
denying Internet access to the host device if its anti-virus protection status is determined not compliant, and
providing software components to brings the host devices into compliance with the anti-virus protection policy if its anti-virus protection status is determined not compliant.

45. The machine-readable medium of claim 44, wherein the determining compliance including determining if the anti-virus protection status is within a range of compliance.

46. The machine-readable medium of claim 44, the performing for each of the plurality of host devices also includes removing the range of compliance upon notices of a virus alert.

47. The machine-readable medium of claim 44, wherein status of the anti-virus protection includes one or more of a version number of the anti-virus protection software on the host device and when the anti-virus protection software was last updated.

48. The machine-readable medium of claim 44, wherein the performing for each of the plurality of host devices also includes initiating an update of the anti-virus protection on the host device.

* * * * *